Figure 1:
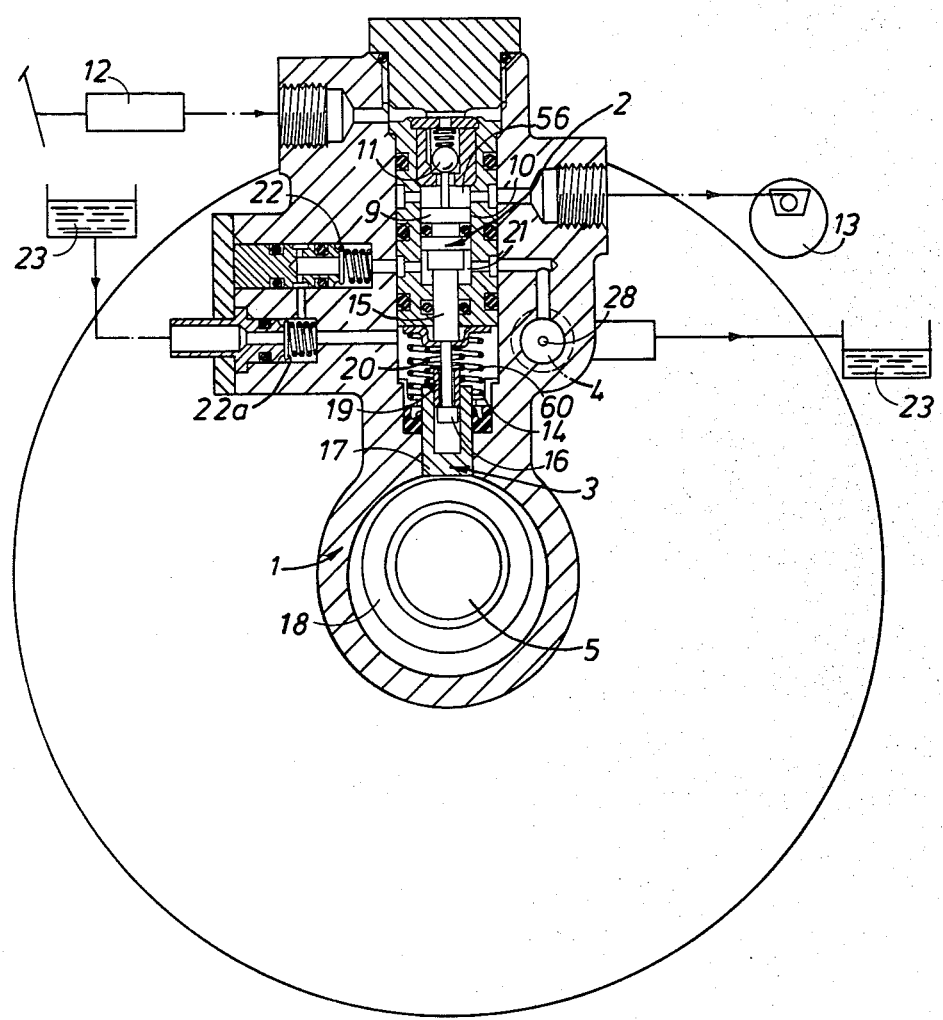

United States Patent [19]

Farr

[11] 4,353,440
[45] Oct. 12, 1982

[54] SKID SENSING MEANS FOR HYDRAULIC ANTI-SKID BRAKING SYSTEMS

[75] Inventor: Glyn P. R. Farr, Warwickshire, England

[73] Assignee: Lucas Industries Limited, Birmingham, England

[21] Appl. No.: 271,105

[22] Filed: Jun. 8, 1981

Related U.S. Application Data

[63] Continuation of Ser. No. 67,938, Aug. 20, 1979, abandoned.

[30] Foreign Application Priority Data

Aug. 18, 1978 [GB] United Kingdom ............... 33788/78

[51] Int. Cl.³ ............................................... B60T 8/16
[52] U.S. Cl. .................. 188/181 A; 303/116
[58] Field of Search ........................ 188/181 A, 181 R; 303/113, 115, 116, 117

[56] References Cited

U.S. PATENT DOCUMENTS

| | | | |
|---|---|---|---|
| 2,766,853 | 10/1956 | Trevaskis et al. | 188/181 A |
| 3,172,505 | 3/1965 | Stelzer | 188/181 A |
| 3,433,535 | 3/1969 | Horvath | 188/181 A X |

*Primary Examiner*—Duane A. Reger
*Attorney, Agent, or Firm*—Scrivener, Clarke, Scrivener and Johnson

[57] ABSTRACT

A flywheel mechanism incorporates a pivotally-mounted lever for operating a pressure control valve when relative angular movement between a thrust member and a flywheel rotatable with a shaft attains a predetermined value. The lever is urged in one direction by a spring and in the opposite direction by axial movement of the thrust member with respect to the flywheel. The effective strength of the spring is responsive to the pressure in a brake line applied to the spring through a connection so that this, in turn, reflects the optimum braking pressure for a particular road surface.

11 Claims, 2 Drawing Figures

ID SENSING MEANS FOR HYDRAULIC ANTI-SKID BRAKING SYSTEMS

SPECIFIC DESCRIPTION

This application is a continuation, of application Ser. No. 067,938, filed Aug. 20, 1979, now abandoned.

This invention relates to skid sensing means for a vehicle anti-skid braking system of the kind comprising a flywheel mechanism rotatable with a shaft and including a flywheel member and a thrust member together with means responsive to relative angular movement between the two said members to cause one of the said members to move axially relative to the other between a first position in which the two members are in a predetermined angular alignement and a second position in which the said one member engages means to actuate a brake pressure control valve, the flywheel mechanism also including means for producing a biassing force to urge the said one member towards the first position.

In skid sensing means of the kind set forth, angular deceleration of the flywheel produces a torque, the magnitude of which is proportional to deceleration. This torque produces an axial force which overcomes the biassing means and causes actuation of the brake pressure control valve.

According to our invention in skid sensing means of the kind set forth the effective biassing force is responsive to pressure in a brake line which is controlled by the control valve.

This permits the threshold deceleration at which the control valve is actuated to be dependent upon the brake line pressure which, at least during second and subsequent skid control cycles, reflects the magnitude of the prevailing tyre/road surface friction coefficient. The range of surface friction coefficient levels over which optimum anti-skid control can be maintained is thereby increased.

The flywheel mechanism preferably includes an over-run clutch to decelerate the flywheel member at a controlled rate following actuation of the control valve, this rate being independent of the wheel deceleration. The flywheel therefore acts as a memory to provide an analogue of vehicle speed which may be used as a reference when determining the brake re-application point.

Conveniently the over-run clutch may be loaded by the said effective biassing force.

Thus the brake re-application point may be controlled in dependence upon the tyre/road surface friction coefficient.

Conveniently the biassing means may comprise a first pressure responsive spring and a second spring.

This enables the brake pressure control valve to be of the poppet or seat type which only require short actuating travels.

Alternatively the control valve may be of the spool type which would permit the use of a single spring.

Conveniently the pressure in the brake line is applied to the first spring through a piston which is exposed at one end to the pressure and at the opposite end abuts against one end of the spring. In such a construction the control valve actuating means may comprise a lever arranged to act on the opposite end of the spring through a plunger so that the spring is trapped between adjacent ends of the piston and the plunger.

Preferably the piston is exposed to pressure in the brake line through a restricted orifice. This has the advantage that when the brake is applied the pressure acts on the piston through the restricted passage to increase load of the first spring. Should a skid occur the control valve is operated so that pressure on the upstream side of the restricted orifice which is remote from the piston is reduced, but a trapped pressure acting on the piston can only leak away through the restricted orifice. Finally, after the skid has been corrected and the control valve is operated again to permit the pressure on the upstream side of the restricted passage to increase and re-apply the brake, the trapped pressure acts through the restricted passage to augment the braking pressure.

Figure 2:
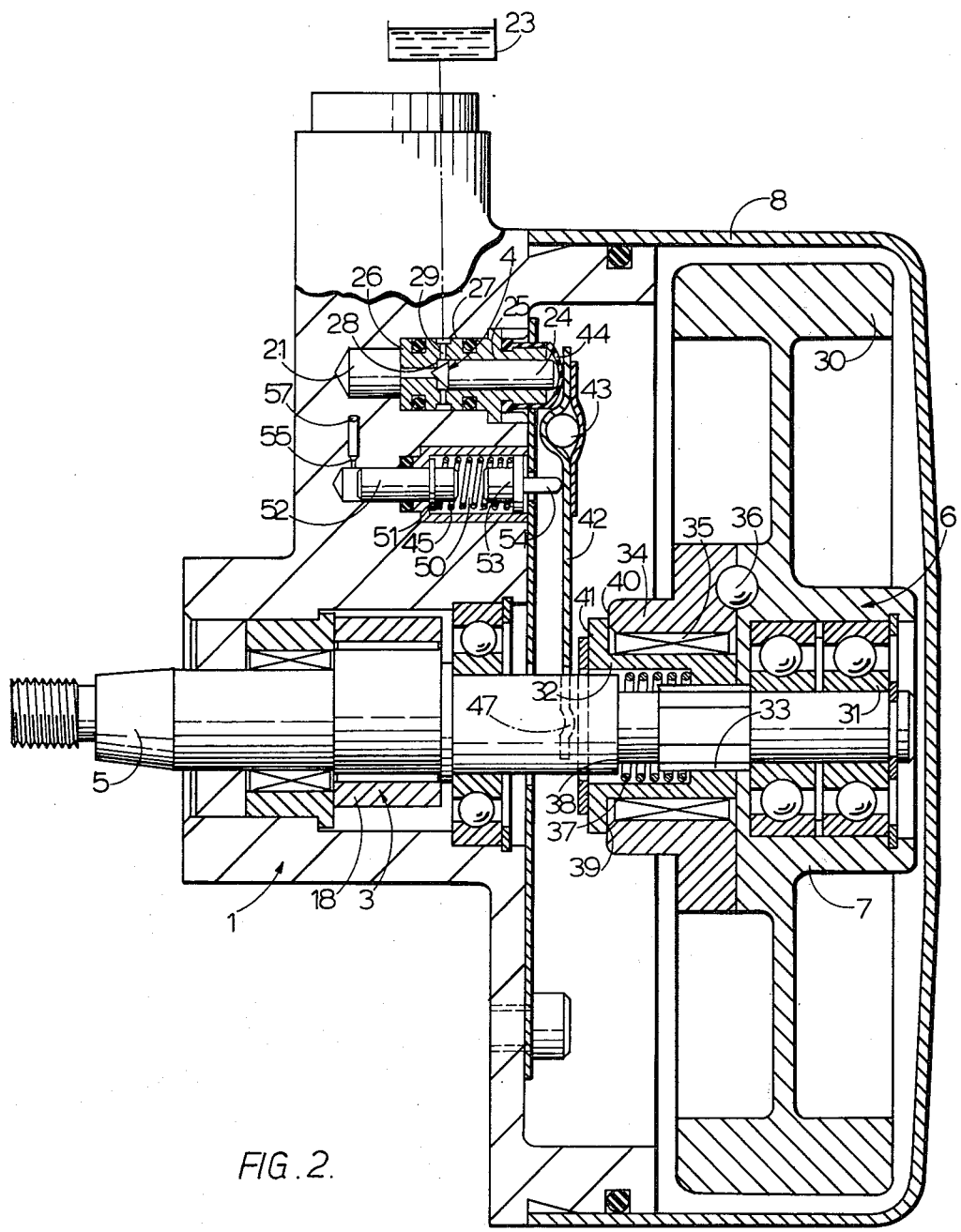

One embodiment of our invention is illustrated in the accompanying drawings in which:

FIG. 1 is a transverse section through a combined modulator and anti-skid sensing assembly for an hydraulic anti-skid braking system; and FIG. 2 is a longitudinal section through the assembly in a plane normal to the plane of FIG. 1.

The assembly illustrated in FIGS. 1 and 2 comprises a housing 1 incorporating a modulator assembly 2, an hydraulic pump 3 and a pressure dump valve 4. A longitudinally extending shaft 5 projecting at opposite ends from the housing 1 is coupled at one end to the wheel and at the other end carries skid sensing means 6 in the form of a flywheel assembly 7 which can be enclosed within a cylindrical guard 8 carried from the adjacent end of the housing 1.

The modulator assembly 2 comprises a signal piston 9 which works in a bore 10 in the housing 1 to control operation of a ball valve 11 which, in turn, controls communication between a master cylinder 12 and the brakes 13. Normally the piston 9 is biassed by a spring 14 in a direction to hold the ball valve 11 open. The piston 9 carries a piston rod 15 which has an enlarged head 16, and the head 16 is adapted normally to hold a pump plunger 17 away from the eccentric cam 18 by means of a sleeve 19 which is a press fit in a bore in the plunger 17. A spring 20 biasses the plunger 17 towards the cam 18. An expansion chamber 21 is defined within the bore 10 between the piston 9, the piston rod 15, and a pair of spaced spring-loaded one-way valves 22 and 22a which are biassed in corresponding directions to prevent fluid in the chamber 21 from flowing back into a reservoir 23.

The dump valve 4 comprises a valve member in the form of a rod 24 which is guided to slide in a bore 25 in a seating member 26 which is received in a recess 27 in the housing 1. Normally the rod 24 is held in engagement with a seating 28 in the member 26 by the flywheel assembly 7. This isolates the expansion chamber 21 from the reservoir 23 through radial ports 29 in the wall of the member 26.

The flywheel assembly 7 comprises a flywheel 30 which is rotatable on bearings 31 at one end of the shaft 5. The flywheel 30 is driven from the shaft 5 through a collar 32 which is keyed to the shaft 5 for relative axial sliding movement through splines 33. A pressure plate 34 surrounds, and is driven by, the collar 32 through a one-way drive 35, and balls 36 are located in complementary recesses in mating faces of the pressure plate 34 and the flywheel 30. The mating faces are urged towards each other by means of a spring 37 which acts between the collar 33 and a shoulder 38 on the shaft 5. A face clutch 39 is defined by an engagement between an end face 40 of the pressure plate 34 and a radial flange 41 on the collar 32.

A lever 42 is mounted to rock about a fulcrum 43 on the end of the housing 1 which is adjacent to the dump valve 4. One end of the lever 42 acts on the free end of the rod 24 of the dump valve 4 through a sealing boot 44. The other end of the lever 42 is urged away from the housing 1 by compression spring 45. Finally, at its free end on the side of the fulcrum 43 remote from the spring 45, the lever 42 acts on the collar 32 through a thrust washer 46 and two domed contact points 47 on opposite sides of the shaft 5.

The spring 45 is housed in a recess 50 in the housing 1 and at opposite ends abuts between a radial flange 51 on a piston 52, and a plunger 53 which carries a stem 54 engaging at its free end with the lever 42. The end of the piston 52 which is remote from the spring 45 is exposed to the pressure applied to the brake 13 through a restricted orifice 55 and a connection.

When the wheel is rotating in a brakes off condition, the spring 14 acts through the piston rod 15 and the sleeve 19 to hold the plunger 17 out of engagement with the cam 18 so that the pump 3 is disabled. The flywheel 30 is driven by, and at the same speed as, the shaft 5, through the one-way drive 35, the balls 36 and the recesses in which they are located. The spring 45 pivots the lever 42 in a direction to hold the dump valve 4 closed.

During normal braking, fluid from the cylinder is supplied to the brake 13 through a chamber 56 above the sensing piston 9 since the valve 11 is held open by the sensing piston 9. The pressure applied to the brake 13 acts against the upper surface of the signal piston 9 which is unable to move because fluid in the expansion chamber 21 between the piston 9 and the rod 15 is trapped between the pressure dump valve 4 and the one-way valve 22. The spring 45 is pre-loaded between the piston 52 and the plunger 53 at an initial threshold setting of say 0.3 g and, as the brake is applied, the piston 52 is moved towards the plunger 53 by the pressure in the brake line which is applied to it through the connection 57 and the restricted orifice 55. This has the effect of increasing the setting of the flywheel assembly 7 since a corresponding greater force will have then to be applied by the assembly 7 to overcome the effective force in the spring 45 before the dump valve 4 can be opened. For example, at a pressure of 1000 p.s.i. when a deceleration of 1 g would be expected, the setting of the flywheel assembly 7 has increased to 1.3 g from the original 0.3 g.

When the pressure from the master cylinder 12 applied to the brake 13 is sufficient to cause the wheel to decelerate by an amount to cause a skid, the braked wheel will have almost certainly decelerated at greater than the threshold value of the flywheel assembly 7. The flywheel 30, moves angularly through a greater distance than the pressure plate 34 and then continues to rotate due to its inertia, on the one-way drive 35. This causes the balls 36 to tend to ride out of their recesses, causing the pressure plate 34 and the collar 32 to move axially on the splines 33 away from the flywheel 30 and pivot the lever 42 against the loading in the springs 45. The flywheel 30 and the pressure plate 34 now run on against the clutch 39.

The closing force applied to the dump valve 4 is thereby relieved and the dump valve 4 opens so that fluid from the expansion chamber 21 can escape to the reservoir 23 thus allowing the signal piston 9 to retract under the effect of the pressure applied to the brake. The piston 9 moves towards the cam 18 to a limit determined by a stop defined by a shoulder in the bore 10 at the lower end of the chamber 21. During this movement the ball valve 11 is permitted to close thus isolating the master cylinder 12 from the brake 13. Further movement of the piston 9 in the same direction and beyond the point at which the valve 11 closes serves to reduce the pressure in the line to the brake 13 by expansion in the effective volume of the chamber 56 above the piston 9 and leading to the brake 13. However the pressure acting on the piston 52 is trapped and can only leak away through the restricted orifice 55.

As the signal piston 9 moves towards the eccentric cam 18, the pump plunger 17 is allowed to engage the eccentric cam 18 and starts to pump fluid through the valve 22a, into a working chamber 60 above the plunger 17, and thence out through the valve 22 and back to the reservoir 23 by way of the pressure dump valve 4.

When the skid has been corrected the pressure dump valve 4 closes, and fluid from the working chamber 60 pressurises the expansion chamber 21. This urges the signal piston 9 back towards its original position, thus re-pressurising the brake line by reducing the effective volume of the chamber 56, and subsequently re-opening the ball valve 11.

If the surface over which the motor cycle or four wheel vehicle is travelling only permits a 0.5 g stop the pressure is cycled around substantially 500 p.s.i. and the setting of the flywheel assembly reduces at 0.8 g.

After the pressure applied to the brake 13 has fallen and the valve 11 has closed, re-application of the brake by the pump as described above is assisted by the volume of fluid trapped behind the piston 24 by the restricted orifice 55. This volume could be increased by the inclusion of a small accumulator.

In the embodiment described above the spring 45 is used in conjunction with the clutch spring 37 to tailor the deceleration threshold and the over-run deceleration of the flywheel 30 to probable vehicle deceleration.

In a modification the rod 24 in the dump valve 4 may be replaced by a member of the spool type. This would permit one of the springs 45 or 37 to be omitted.

I claim:

1. Skid sensing means for a vehicle antiskid braking system of the type comprising a brake, a supply of fluid under pressure for applying said brake, a brake pressure modulator for modulating the supply of fluid from said supply to said brake, and a brake-line through which said fluid is supplied to said brake from said modulator, said skid sensing means comprising a rotatable shaft a flywheel mechanism rotatable with said shaft, said flywheel mechanism comprising a flywheel member, a thrust member, and means responsive to relative angular movement between said members to cause one of said members to move axially relative to the other between a first position in which said members are in a predetermined angular alignment and a second position in which the said one member engages said actuating means to actuate said modulator, said flywheel mechanism also including biassing means for producing a biassing force to urge the said one member towards said first position to determine a threshold setting of said flywheel mechanism, and wherein said biassing means incorporates means responsive at all times to a control pressure dependent upon pressure in said brake-line to vary said threshold setting in accordance with said control pressure.

2. Skid sensing means as claimed in claim 1, wherein said flywheel mechanism includes an over-run clutch to decelerate said flywheel member at a controlled rate following actuation of said modulator, said rate being independent of wheel deceleration.

3. Skid sensing means as claimed in claim 2, wherein said over-run clutch is loaded by said effective biassing force.

4. Skid sending means as claimed in claim 1, wherein said biassing means for producing said biassing force comprises at least one spring.

5. Skid sensing means as claimed in claim 4, wherein a single spring is incorporated, and said modulator includes a control valve of the spool type.

6. Skid sensing means as claimed in claim 4, wherein a first pressure responsive spring and a second spring are incorporated.

7. Skid sensing means as claimed in claim 6, incorporating a piston through which said pressure is applied to said first spring, and said piston is exposed at one end to said pressure and at the opposite end abuts against one end of said first spring.

8. Skid sensing means as claimed in claim 7, wherein said actuating means comprise a lever arranged to act on the opposite end of said spring, and a plunger is disposed between said lever and said spring said spring is trapped between adjacent ends of said piston and said plunger.

9. Skid sensing means as claimed in claim 7, wherein said pressure acts on said piston through a restricted passage.

10. Skid sensing means as claimed in claim 1, wherein said means responsive to control pressure comprises a piston, and said control pressure acts on said piston through a restricted passage.

11. Skid sensing means as claimed in claim 1, wherein said control pressure comprises pressure in said brake-line.

* * * * *